(12) United States Patent
Syrjarinne et al.

(10) Patent No.: US 9,453,915 B2
(45) Date of Patent: Sep. 27, 2016

(54) PORTABLE COMMUNICATION TERMINALS AND METHODS FOR COOPERATIVE POSITIONING SUPPORT DURING POOR SATELLITE COVERAGE

(75) Inventors: Jari Tapani Syrjarinne, Tampere (FI); Altti Samuli Jokinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 802 days.

(21) Appl. No.: 13/703,972

(22) PCT Filed: Jun. 29, 2010

(86) PCT No.: PCT/IB2010/001584
§ 371 (c)(1),
(2), (4) Date: Dec. 13, 2012

(87) PCT Pub. No.: WO2012/001443
PCT Pub. Date: Jan. 5, 2012

(65) Prior Publication Data
US 2013/0088384 A1    Apr. 11, 2013

(51) Int. Cl.
G01S 19/05    (2010.01)
H04W 64/00   (2009.01)
H04W 84/18   (2009.01)

(52) U.S. Cl.
CPC .............. *G01S 19/05* (2013.01); *H04W 64/00* (2013.01); *H04W 84/18* (2013.01)

(58) Field of Classification Search
CPC ...... G01S 19/05; H04W 64/00; H04W 84/18
USPC ................................................ 342/357.42
See application file for complete search history.

(56) References Cited

U.S. PATENT DOCUMENTS 6,185,429 B1 *  2/2001  Gehrke ................ H04B 7/2693
                                                   455/502
6,611,755 B1 *  8/2003  Coffee .................... B28C 5/422
                                                   340/438

(Continued)

FOREIGN PATENT DOCUMENTS

GB       2 410 653 A      8/2005
WO   WO 2006/094573 A1    9/2006

(Continued)

OTHER PUBLICATIONS

Gleason, et al., "GNSS Applications and Methods", Artech House, British Library, Indoor and Weak Signal Navigation, (2009), (pp. 291-327).

*Primary Examiner* — Frank J McGue
(74) *Attorney, Agent, or Firm* — Harrington & Smith

(57) ABSTRACT

In one or more embodiments described herein, there is provided an apparatus including a memory having computer code stored thereon, and a processor. The code is configured to cause the apparatus to: receive partial GNSS data from one or more GNSS satellites relating to the geographical location of a first portable electronic device, wherein the received partial GNSS data is insufficient for determining the geographical location of the first portable electronic device; communicate with one or more further portable electronic devices in proximity to the first portable electronic device to access partial GNSS data relating to the geographical location of the respective further portable electronic devices; and use the accessed partial GNSS data of the further portable electronic devices to supplement the received partial GNSS data of the first portable electronic device to thereby determine the geographical location of the first device.

15 Claims, 12 Drawing Sheets

(56) References Cited

U.S. PATENT DOCUMENTS

| | | |
|---|---|---|
| 6,646,603 B2 | 11/2003 | Dooley et al. ................ 342/458 |
| 7,039,136 B2 * | 5/2006 | Olson ................. H04B 1/7103 |
| | | 375/346 |
| 2001/0033627 A1 | 10/2001 | Syrjarinne .................... 375/354 |
| 2004/0027283 A1 | 2/2004 | Dooley et al. ................ 342/458 |
| 2005/0212698 A1 | 9/2005 | Barron et al. ........... 342/357.06 |
| 2007/0024498 A1 | 2/2007 | Korneluk et al. ....... 342/357.09 |
| 2007/0225016 A1 * | 9/2007 | Jendbro ................. G01S 19/05 |
| | | 455/456.1 |
| 2008/0252519 A1 | 10/2008 | Moon ...................... 342/357.09 |
| 2009/0228209 A1 | 9/2009 | Alanen et al. ................ 701/214 |

FOREIGN PATENT DOCUMENTS

| | | |
|---|---|---|
| WO | WO 2008/100351 A2 | 8/2008 |
| WO | WO 2009/129844 A1 | 10/2009 |

* cited by examiner

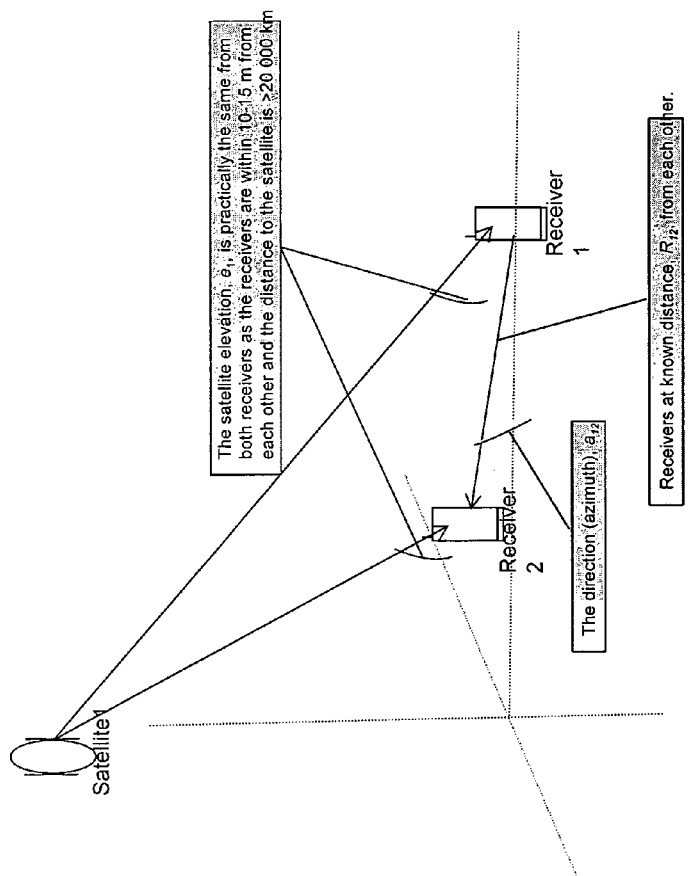
Fig. 2b
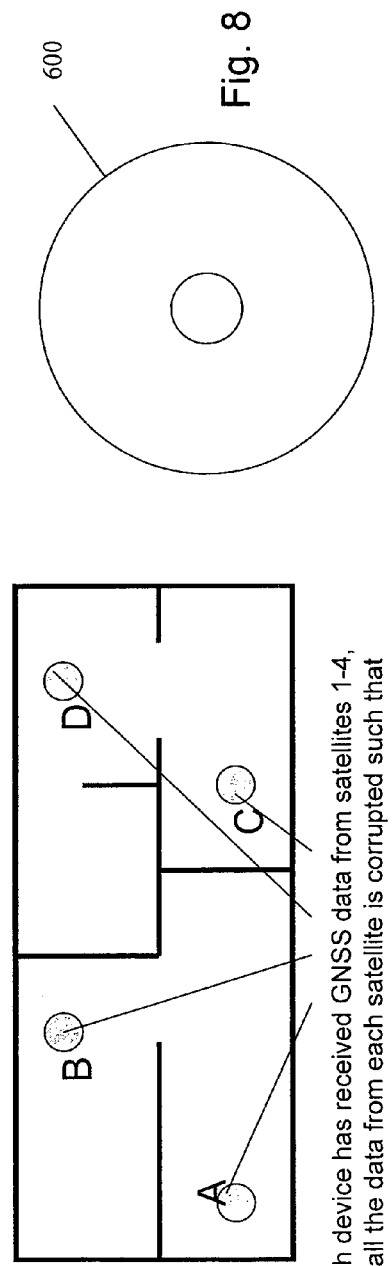
Fig. 3a
Fig. 8

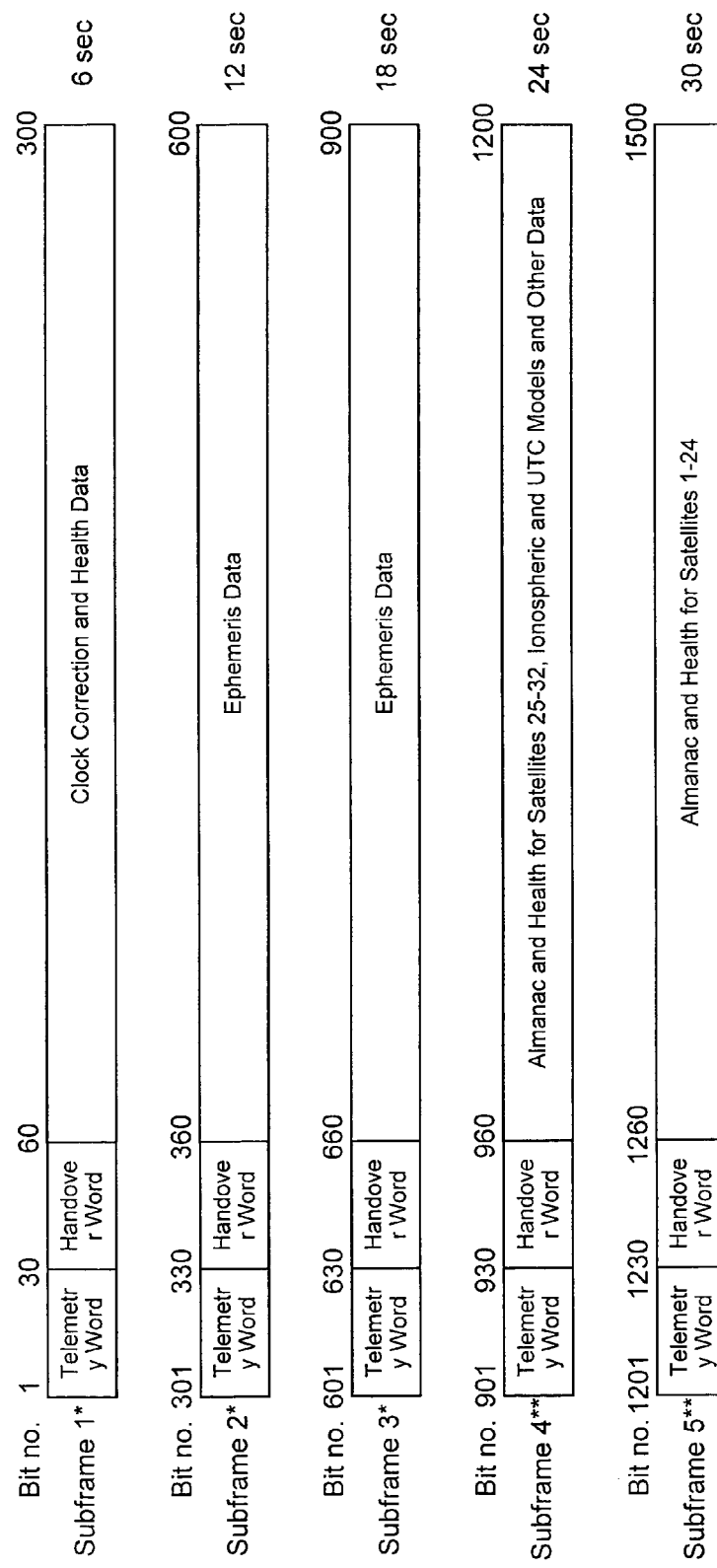

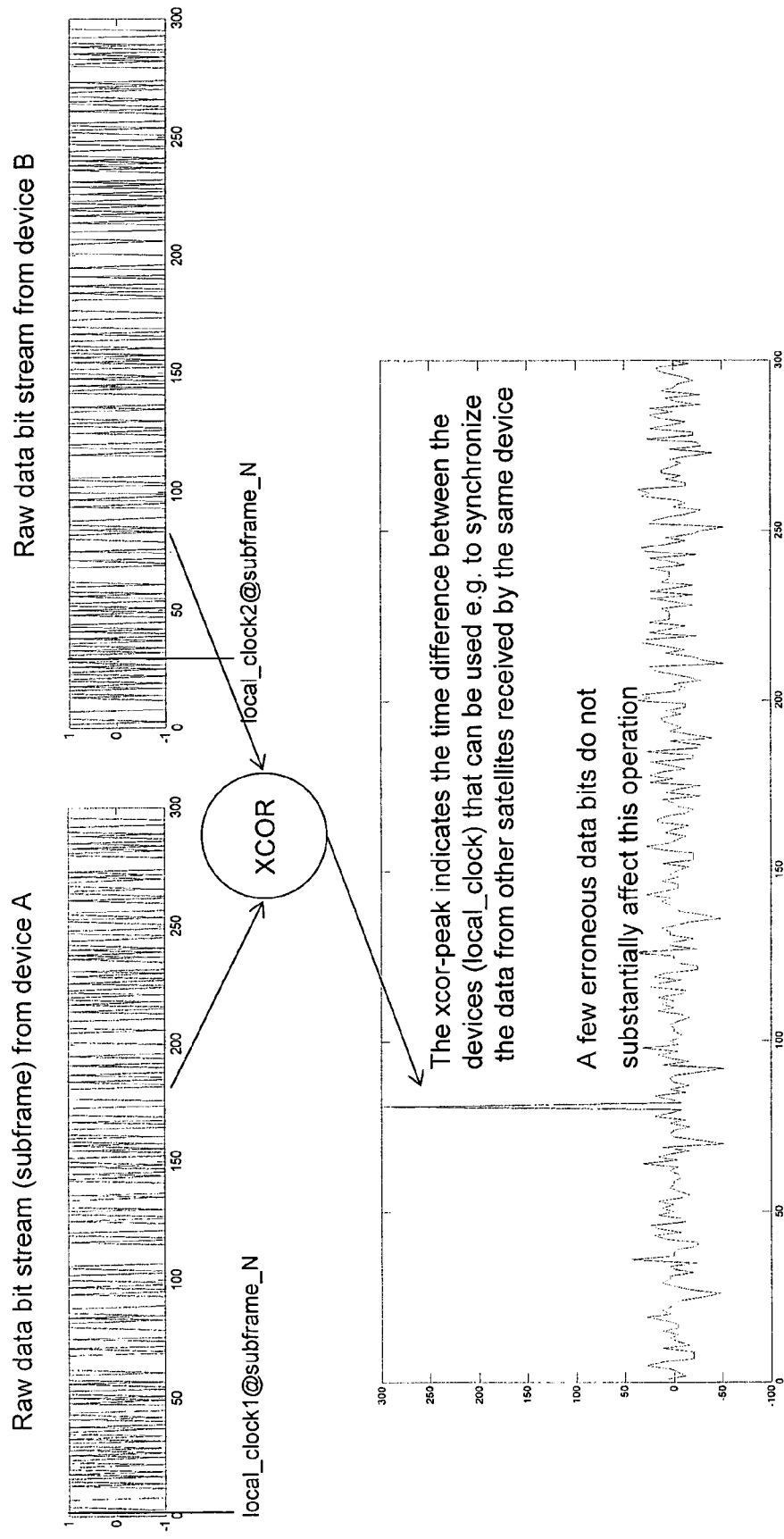

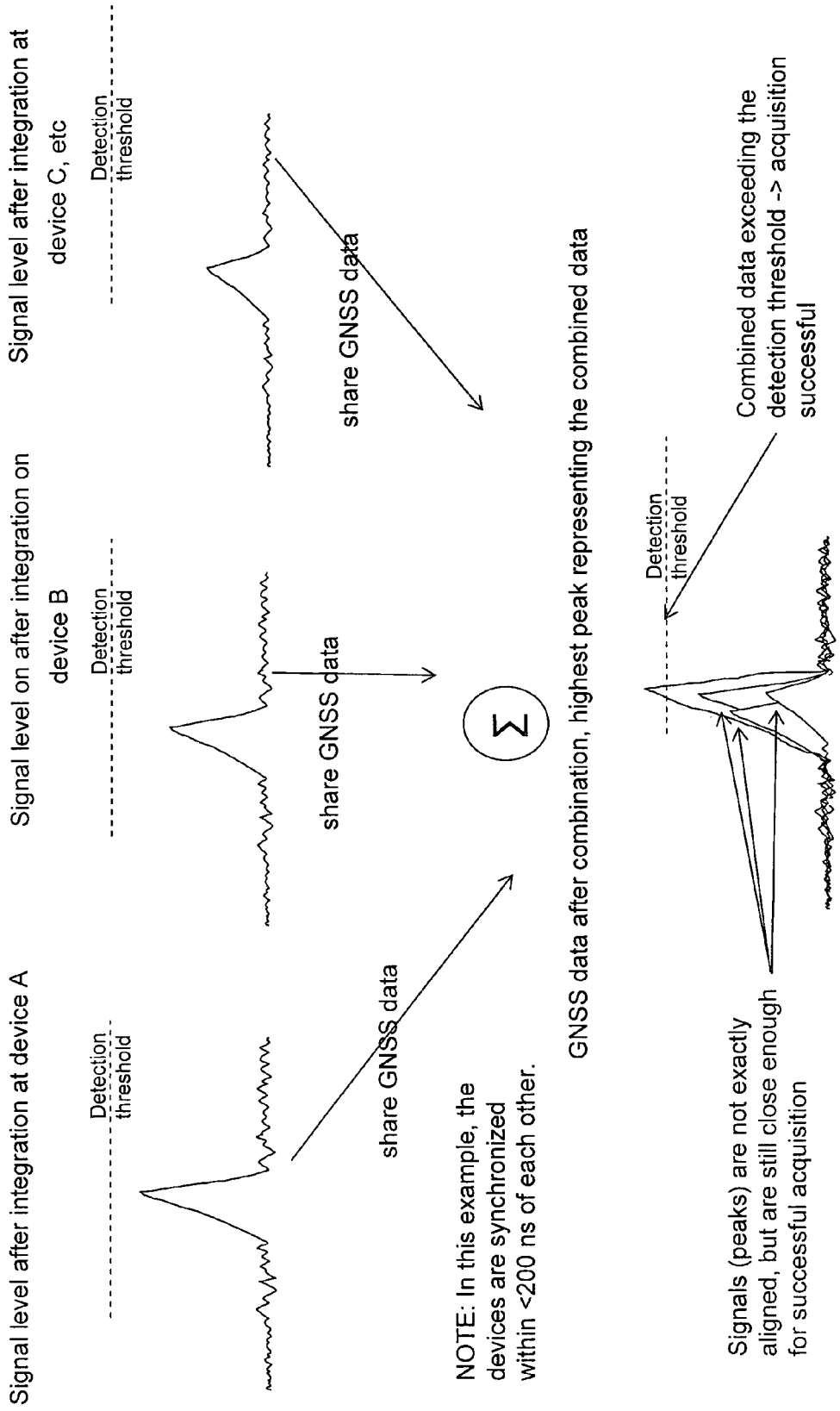

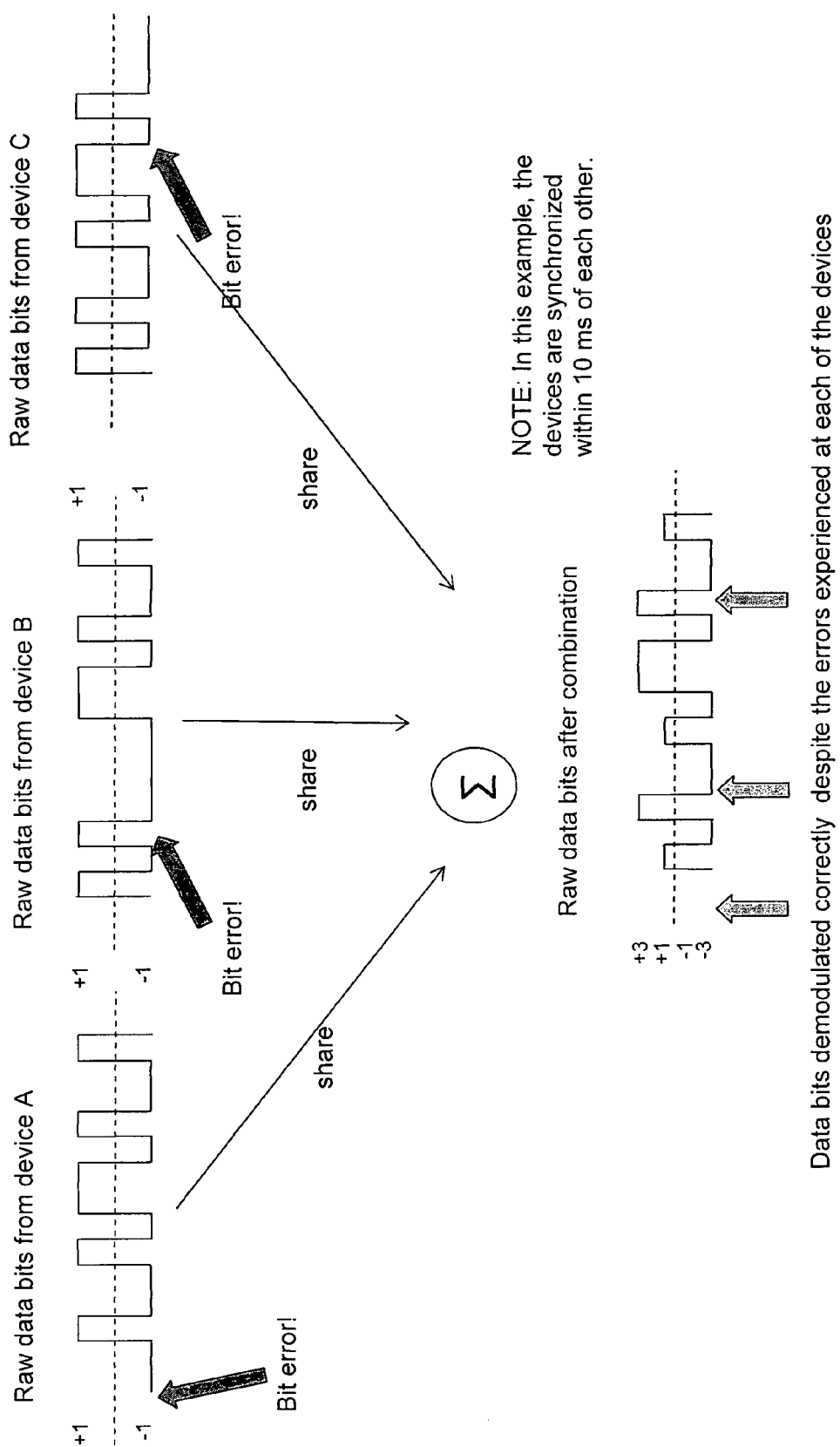

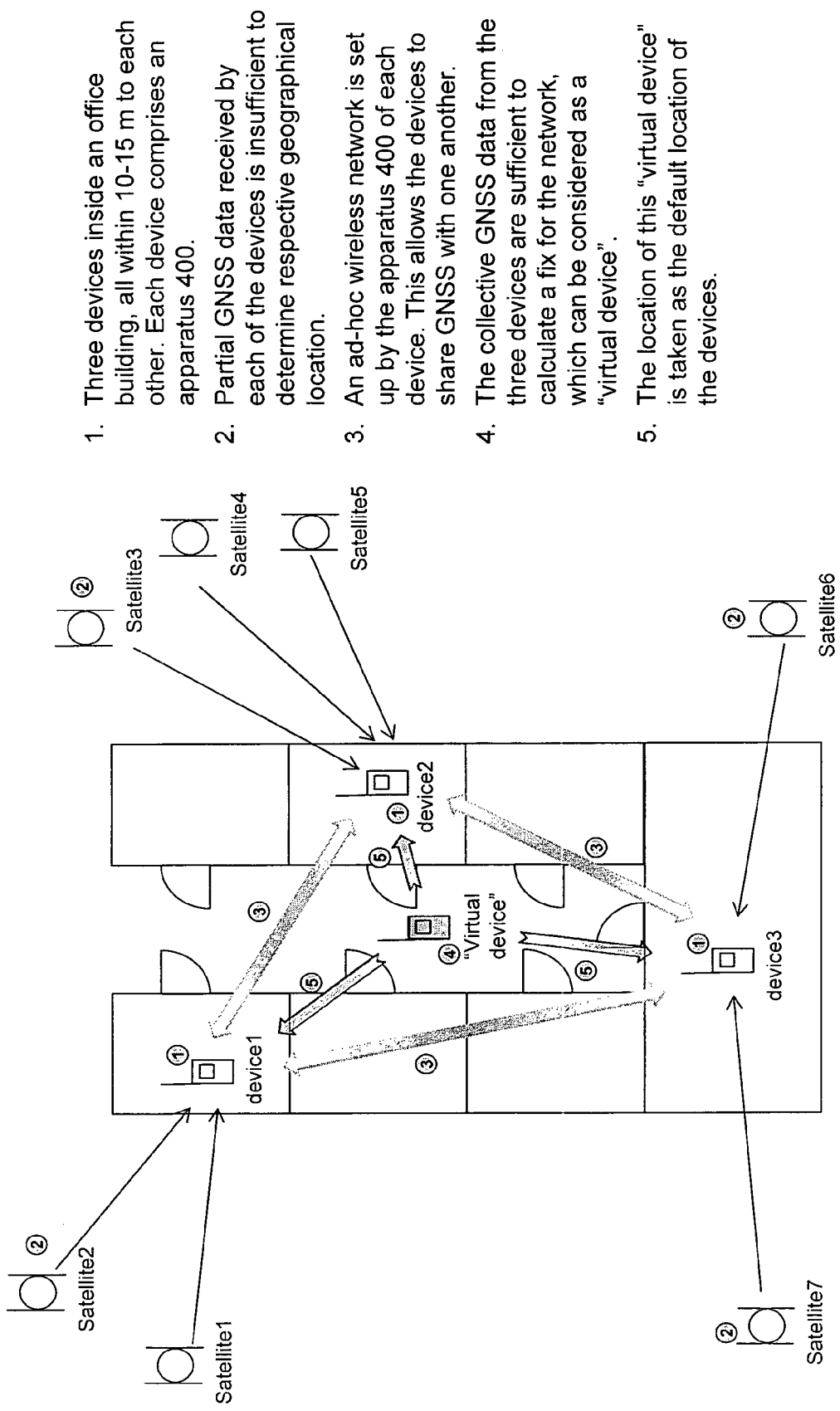

Fig. 6

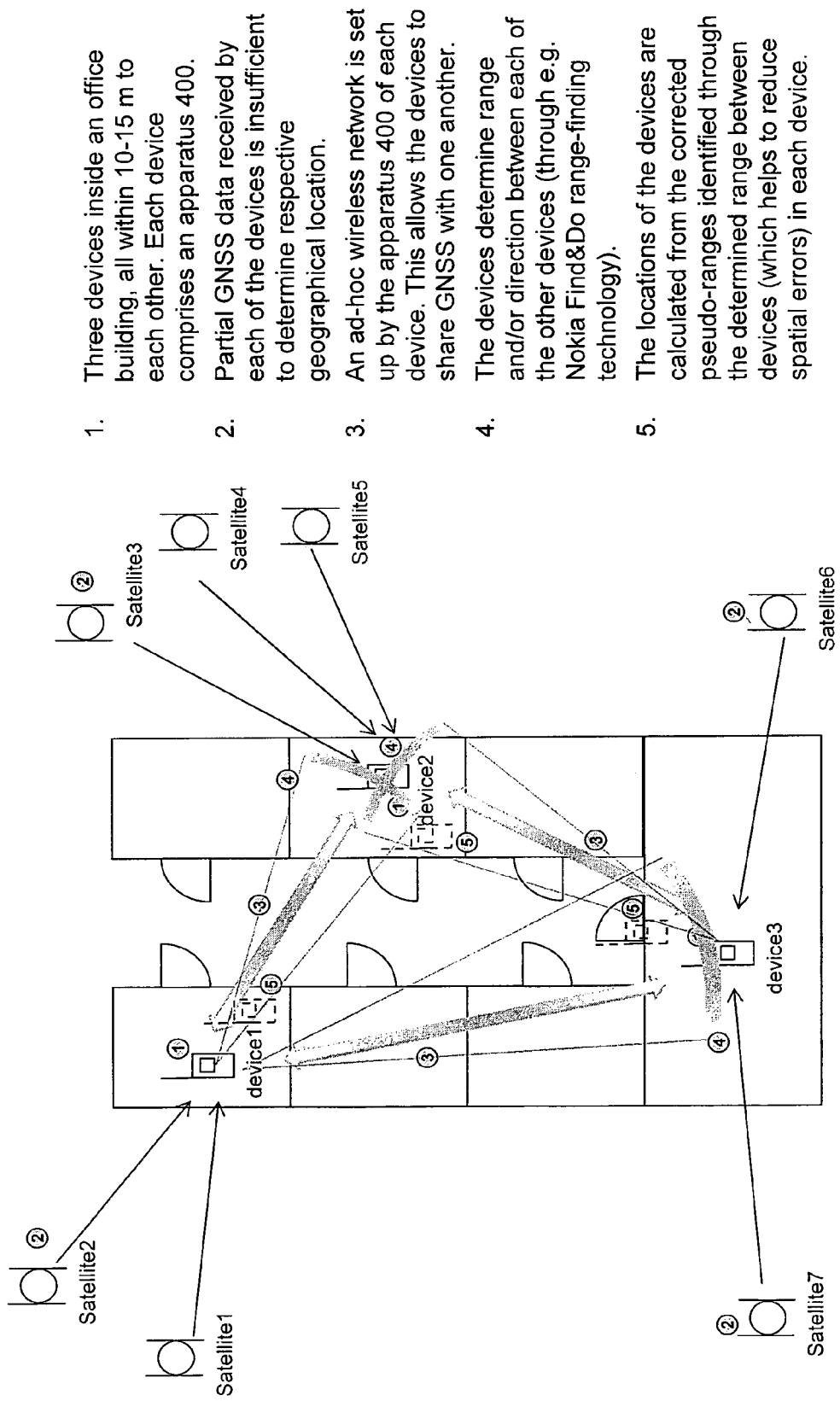

1. Three devices inside an office building, all within 10-15 m to each other. Each device comprises an apparatus 400.

2. Partial GNSS data received by each of the devices is insufficient to determine respective geographical location.

3. An ad-hoc wireless network is set up by the apparatus 400 of each device. This allows the devices to share GNSS with one another.

4. The devices determine range and/or direction between each of the other devices (through e.g. Nokia Find&Do range-finding technology).

5. The locations of the devices are calculated from the corrected pseudo-ranges identified through the determined range between devices (which helps to reduce spatial errors) in each device.

Co-operative device Case
(non-synchronized i.e. the worst case)

Pseudo-range equation for multiple device case where GNSS data is shared (augmented with the device clock differences ($\Delta \tau_{ij}$)).

$$\tilde{\rho}_i = \|\underline{x}_i(T) - \underline{x}_{user}\| + \Delta t + \sum_{j=1}^{W} \Delta \tau_{ij}$$

The augmented DCM has partial derivatives with respect to $\Delta \tau_{ij}$'s $$\tilde{H} = \begin{bmatrix} \frac{\partial \rho_1}{\partial x} & \frac{\partial \rho_1}{\partial y} & \frac{\partial \rho_1}{\partial z} & 1 & \frac{\partial \rho_1}{\partial T} & 0 & 0 \\ \frac{\partial \rho_2}{\partial x} & \frac{\partial \rho_2}{\partial y} & \frac{\partial \rho_2}{\partial z} & 1 & \frac{\partial \rho_2}{\partial T} & 0 & 0 \\ \frac{\partial \rho_3}{\partial x} & \frac{\partial \rho_3}{\partial y} & \frac{\partial \rho_3}{\partial z} & 1 & \frac{\partial \rho_3}{\partial T} & 1 & 0 \\ \frac{\partial \rho_4}{\partial x} & \frac{\partial \rho_4}{\partial y} & \frac{\partial \rho_4}{\partial z} & 1 & \frac{\partial \rho_4}{\partial T} & 1 & 0 \\ \frac{\partial \rho_5}{\partial x} & \frac{\partial \rho_5}{\partial y} & \frac{\partial \rho_5}{\partial z} & 1 & \frac{\partial \rho_5}{\partial T} & 1 & 0 \\ \frac{\partial \rho_6}{\partial x} & \frac{\partial \rho_6}{\partial y} & \frac{\partial \rho_6}{\partial z} & 1 & \frac{\partial \rho_6}{\partial T} & 0 & 1 \\ \frac{\partial \rho_7}{\partial x} & \frac{\partial \rho_7}{\partial y} & \frac{\partial \rho_7}{\partial z} & 1 & \frac{\partial \rho_7}{\partial T} & 0 & 1 \end{bmatrix}$$

First two measurements first device measurements -> all $\Delta \tau_{ij}$'s are zero Next three measurements are shared measurements from further device (2) -> $\Delta \tau_{12}$ exists, $\Delta \tau_{13}$ is zero The last two measurements are shared measurements from further device (3) -> $\Delta \tau_{12}$ is zero, $\Delta \tau_{13}$ exists If accurate time is known, these are not needed -> 6 measurements is enough.

Fig. 9b

Single device Case

"Default" pseudo-range equation with four unknowns: x,y,z and clock_bias ($\Delta t$)

$$\rho_i = \|\underline{x}_i(T) - \underline{x}_{user}\| + \Delta t$$

$$\underline{x}_{user} = \begin{bmatrix} x & y & z \end{bmatrix}$$

The "default" 4x4 direction cosine matrix (DCM), partial derivatives with respect to all unknowns $$H = \begin{bmatrix} \frac{\partial \rho_1}{\partial x} & \frac{\partial \rho_1}{\partial y} & \frac{\partial \rho_1}{\partial z} & 1 & \frac{\partial \rho_1}{\partial T} \\ \frac{\partial \rho_2}{\partial x} & \frac{\partial \rho_2}{\partial y} & \frac{\partial \rho_2}{\partial z} & 1 & \frac{\partial \rho_2}{\partial T} \\ \frac{\partial \rho_3}{\partial x} & \frac{\partial \rho_3}{\partial y} & \frac{\partial \rho_3}{\partial z} & 1 & \frac{\partial \rho_3}{\partial T} \\ \frac{\partial \rho_4}{\partial x} & \frac{\partial \rho_4}{\partial y} & \frac{\partial \rho_4}{\partial z} & 1 & \frac{\partial \rho_4}{\partial T} \\ \frac{\partial \rho_5}{\partial x} & \frac{\partial \rho_5}{\partial y} & \frac{\partial \rho_5}{\partial z} & 1 & \frac{\partial \rho_5}{\partial T} \end{bmatrix}$$

In the coarse time assistance case, the system time needs to be solved -> partial derivatives with respect to system time ($T$) are also calculated -> at least 5 measurements needed for 5 unknowns.

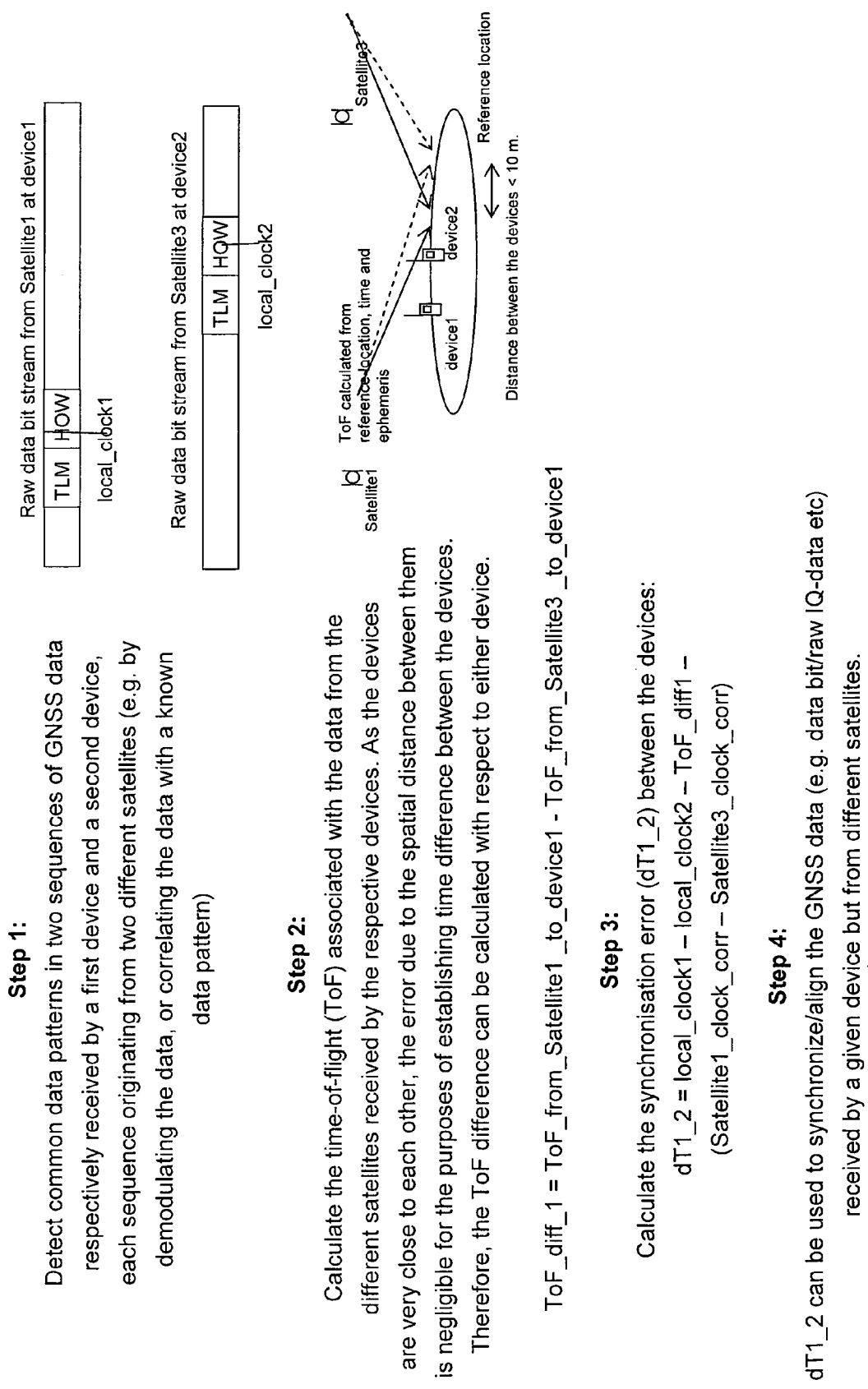

Step 1:

Detect common data patterns in two sequences of GNSS data respectively received by a first device and a second device, each sequence originating from two different satellites (e.g. by demodulating the data, or correlating the data with a known data pattern)

Step 2:

Calculate the time-of-flight (ToF) associated with the data from the different satellites received by the respective devices. As the devices are very close to each other, the error due to the spatial distance between them is negligible for the purposes of establishing time difference between the devices. Therefore, the ToF difference can be calculated with respect to either device.

ToF_diff_1 = ToF_from_Satellite1_to_device1 - ToF_from_Satellite3_to_device1

Step 3:

Calculate the synchronisation error (dT1_2) between the devices:

dT1_2 = local_clock1 – local_clock2 – ToF_diff1 – (Satellite1_clock_corr – Satellite3_clock_corr)

Step 4:

dT1_2 can be used to synchronize/align the GNSS data (e.g. data bit/raw IQ-data etc) received by a given device but from different satellites.

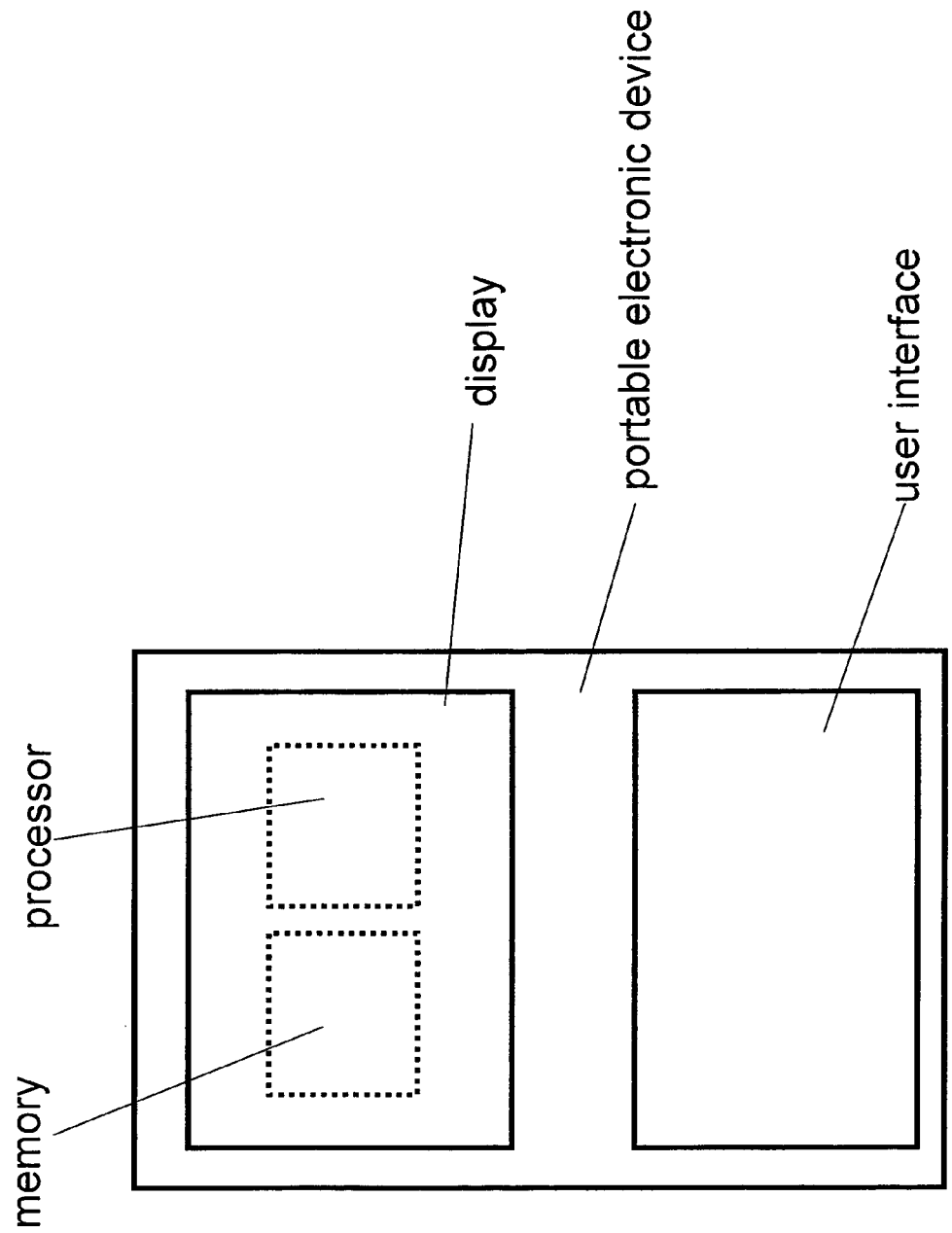

PORTABLE COMMUNICATION TERMINALS AND METHODS FOR COOPERATIVE POSITIONING SUPPORT DURING POOR SATELLITE COVERAGE

TECHNICAL FIELD

The present disclosure relates to the field of geographical location determination, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Services such as location based services (often focused around personal navigation, e.g. Sat-Nav for vehicles) are becoming very popular with the general public. As such, GPS and Assisted-GPS (A-GPS) technologies (as well as other variations and alternatives, such as GLONASS, etc) are becoming relatively mainstream in a wide range of portable electronic devices. Such satellite systems are known as Global Navigation Satellite Systems (GNSS). GNSS is the standard generic term for satellite navigation systems ("sat nav") that provide autonomous geo-spatial positioning with global coverage. There are many types of GNSS available, such as NAVSTAR, GLONASS, Beidou, etc.

Such GNSS systems stream data from their respective satellites. This data signalling is then received by GNSS-capable devices. This data streamed by the satellites is sampled by the GNSS receivers of these devices from the continuous transmitted satellite signal into discrete data samples, and raw IQ samples are obtained as results from this sampling operation. These raw IQ data samples contain encoded timing data and other information as various 'words' that are useful in determining geographical location of the device that has received the data. The raw IQ data needs to be decoded into raw data bits at the receiver end first before the encoded information contained therein can be used.

Satellite positioning systems can be effective for locating a device's position outdoors, but can be problematic inside buildings or in other places where direct view/line-of-sight of the sky is blocked or obstructed, or reception is poor. It can be difficult to obtain positioning data from the required number of satellites (typically four) to determine geographical location when such complications occur.

In addition to GPS and A-GPS, short-range connectivity/communication solutions such as Bluetooth™ and WiFi (such as the various 802.11 wireless standards) have become common technologies in many portable electronic devices.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided an apparatus comprising:
at least one memory; and
at least one processor, wherein the memory comprises computer code stored thereon, the code being configured to, when run on the processor, cause the apparatus to perform at least:
receiving partial GNSS data from one or more GNSS satellites relating to the geographical location of a first portable electronic device, wherein the received partial GNSS data is insufficient for determining the geographical location of the first portable electronic device;
communicating with one or more further portable electronic devices in proximity to the first portable electronic device to access partial GNSS data relating to the geographical location of the respective further portable electronic devices; and
using the accessed partial GNSS data of the further portable electronic devices to supplement the received partial GNSS data of the first portable electronic device to thereby determine the geographical location of the first device.

The term "GNSS data" may be understood to encompass raw IQ data and/or, raw GNSS data bits. GNSS data may also encompass one or more of: demodulated data bits, and measurements derived/obtained from the received IQ data/samples/bits. These measurements may be understood to include/encompass measurements of one or more of: pseudo-ranges between the first device and one or more satellites, Doppler measurements of the received GNSS satellite signal, carrier phase of the GNSS satellite signal, distance/timing values (in SI or GPS units or the like).

The GNSS data may also be understood to encompass one or more: subframes of the GNSS satellite signal, navigation data from the first device and/or network, and assistance data from the first device and/or network (for example, satellite ephemeris predictions generated by the device, e.g. by SAGPS™ technology).

Accessing further GNSS data through communicating with other devices can help to enhance or complete the partial GNSS data already received for the first device. This can in turn allow the geographical location or position of the first device to be determined.

The partial GNSS data received by any of the devices may comprise GNSS data respectively received from one or more satellites. The term partial GNSS data may be understood to be partial/insufficient in the sense that the GNSS data that has been received is identified to be from fewer than the number of satellites required to determine a geographical location. The partial GNSS data may be understood to be partial/insufficient in the sense that the GNSS data is corrupt or unusable in a way that prevents the data being used to successfully determine a geographical location. For example, there may be too many bit errors in the decoded data bits (decoded from the raw IQ data), or the signal-to-noise ratio of the raw IQ data to-be-received may be below the detection threshold. The partial GNSS data may be understood to be partial/insufficient using at least one or the following meanings.

The code may be configured to, when run on the processor, cause the apparatus to use the accessed partial GNSS data of the further portable electronic devices by:

identifying the one or more respective GNSS satellites from where the partial GNSS data of the first device and the respective further devices originated to supplement the received partial GNSS data of the first portable electronic device so that the supplemented partial GNSS data is sufficient for determining the geographical location of the first device.

Identifying the respective satellites from where the accessed partial GNSS data originated can be helpful for the apparatus to ascertain which portions of accessed partial GNSS data of the respective further devices can serve to supplement the first device partial GNSS data and which are not necessary.

For example, there may be a scenario where a first device has only received GNSS data (whether IQ data or GNSS data bits) from three satellites out of the four necessary to establish geographical location. It is then known that, to establish position, data from a further fourth distinct satellite must be obtained. The apparatus then communicates (for example, on behalf of the first device) with other nearby devices. The apparatus may then identify that another device has received GNSS data from (at least) a fourth distinct satellite. The apparatus can then co-operatively share/use the other device's GNSS data (corresponding to the fourth satellite) to supplement the first device data to allow for successful determination of the geographical location of the first device.

The code may be configured to, when run on the processor, cause the apparatus to use the accessed partial GNSS data of the further portable electronic devices together with the first device partial GNSS data as collective partial GNSS data to thereby determine the geographical location of the first device.

By treating the accessed partial GNSS data and first device GNSS data like a co-operative collective "pool" of GNSS data, it is possible for each device contributing to the pool to be able to determine their own locations as by sharing data as a group.

The communication may be performed over one or more different types of wireless and/or wired communication, such as TCP/IP connection, Bluetooth, WiFi (various 802.11 configurations) and the like. Alternatively, certain embodiments may utilise proprietary protocols for data communication/transfer.

The code may be configured to, when run on the processor, cause the apparatus to categorise the accessed partial GNSS data of the respective further devices so that partial GNSS data transmitted by the same respective satellites are grouped together into corresponding satellite data groups.

By categorising the partial GNSS data from different satellites as received by different devices, it is possible to collate each satellite's GNSS data (from a number of devices) and allow for further operations on the different groupings of common satellite GNSS data.

The code may be configured to, when run on the processor, cause the apparatus to use the accessed partial GNSS data of the further portable electronic devices by:

measuring a synchronisation error between the first and respective further devices based on a comparison between the respective further and first device partial GNSS data to allow for synchronisation of the respective further and first device partial GNSS data.

As there may be some timing or synchronisation mismatch between first device and respective further device partial GNSS data, it is helpful to compare the data sets against each other first to measure their synchronisation error.

The code may be configured to, when run on the processor, cause the apparatus to measure the synchronisation error by identifying the time difference between one or more common timestamp peaks of the partial GNSS data from the respective further and first devices.

The code may be configured to, when run on the processor, cause the apparatus to measure the synchronisation error by matching one or more common data patterns between the respective partial GNSS data from the respective further and first devices.

The code may be configured to, when run on the processor, cause the apparatus to synchronise the respective further and first device partial GNSS data using the measured synchronisation error. This can help to compensate for the synchronisation error.

The measured synchronisation error may be indicative of a time offset in respective further device partial GNSS data. The code may be configured to, when run on the processor, cause the apparatus to synchronise the respective further and first device partial GNSS data by using this time offset indicated by the synchronisation error to perform time correction on the respective further device partial GNSS data.

By matching common timestamp or data patterns through comparing respective GNSS data, it is possible to establish the time difference representative of the synchronisation error between respective data sets. This can then be used to compensate for the synchronisation error.

The code may be configured to, when run on the processor, cause the apparatus to use the accessed partial GNSS data of the further portable electronic devices by:

identifying the respective GNSS satellites from where the partial GNSS data of the first device and the respective further devices originated; and calculating, for respective further and first device partial GNSS data identified to originate from two or more different identified satellites, the time of flight and satellite clock differences between the two or more different satellites based on ephemeris reference location of the respective identified satellites to allow for alignment of corresponding respective further device partial GNSS data.

The code may be configured to, when run on the processor, cause the apparatus to align the corresponding respective further and first device partial GNSS data by performing time correction using the calculated time of flight and/or satellite clock differences.

Utilising further information such as time of flight and satellite clock differences can allow GNSS data from two or more different satellites to be used to align/synchronise data for respective devices.

The code may be configured to, when run on the processor, cause the apparatus to use the accessed respective further device partial GNSS data by:

identifying the respective GNSS satellites from where the partial GNSS data of the first device and the respective further devices originated; and summing respective further device and first device partial GNSS data identified to originate from the same satellite to thereby supplement the partial GNSS data of the first device to improve signal-to-noise ratio in the GNSS data from each respective satellite.

The code may be configured to, when run on the processor, cause the apparatus to use one or more of the following types of partial GNSS data from the respective further devices and the first device to determine the geographical location of the first device:

raw IQ data, and raw GNSS data bits.

The raw GNSS data bits may also comprise demodulated GNSS data that is in SI units, or in GPS units, or other units used in GNSS measurement systems. This can allow for sharing of GNSS data between satellite systems, as SI units are commonly understood whilst proprietary encoding may not be easily communicable across satellite systems/platforms.

The code may be configured to, when run on the processor, cause the apparatus to use the accessed respective further device partial GNSS data by:

determining the range between the first device and the one or more respective further devices that have been communicated with to further supplement the received partial GNSS data of the first.

The code may be configured to, when run on the processor and the partial GNSS data of the first and respective further devices comprises raw GNSS data bits, cause the apparatus to use the synchronised respective further and first device raw GNSS data bits to:

form a combined GNSS data bit sequence by sharing data bits of corresponding respective further and first device partial GNSS data identified to originate from the same satellite to thereby reduce bit error in the respective further and first device partial GNSS data.

By using certain portions of partial GNSS data (specifically GNSS data bits from partial GNSS data) from different devices for the same satellite, it is possible to reduce bit errors that may occur in one or more of the respective GNSS data.

In another aspect, the apparatus may be or comprise one or more of the following:

a portable electronic device, a module for a portable electronic device, a network for portable electronic devices, a system for portable electronic devices.

In another aspect there is provided an apparatus configured to:

receive partial GNSS data from one or more GNSS satellites relating to the geographical location of a first portable electronic device, wherein the received partial GNSS data is insufficient for determining the geographical location of the first portable electronic device;

communicate with one or more further portable electronic devices in proximity to the first portable electronic device to access partial GNSS data relating to the geographical location of the respective further portable electronic devices; and use the accessed partial GNSS data of the further portable electronic devices to supplement the received partial GNSS data of the first portable electronic device to thereby determine the geographical location of the first device.

In another aspect there is provided an apparatus comprising:

means for receiving partial GNSS data from one or more GNSS satellites relating to the geographical location of a first portable electronic device, wherein the received partial GNSS data is insufficient for determining the geographical location of the first portable electronic device;

means for communicating with one or more further portable electronic devices in proximity to the first portable electronic device to access partial GNSS data relating to the geographical location of the respective further portable electronic devices; and means for using the accessed partial GNSS data of the further portable electronic devices to supplement the received partial GNSS data of the first portable electronic device to thereby determine the geographical location of the first device.

In another aspect there is provided an apparatus configured to:

a receiver for receiving partial GNSS data from one or more GNSS satellites relating to the geographical location of a first portable electronic device, wherein the received partial GNSS data is insufficient for determining the geographical location of the first portable electronic device;

a communicator for communicating with one or more further portable electronic devices in proximity to the first portable electronic device to access partial GNSS data relating to the geographical location of the respective further portable electronic devices; and a supplementer for using the accessed partial GNSS data of the further portable electronic devices to supplement the received partial GNSS data of the first portable electronic device to thereby determine the geographical location of the first device.

In yet another aspect there is provided a method comprising:

receiving partial GNSS data from one or more GNSS satellites relating to the geographical location of a first portable electronic device, wherein the received partial GNSS data is insufficient for determining the geographical location of the first portable electronic device;

communicating with one or more further portable electronic devices in proximity to the first portable electronic device to access partial GNSS data relating to the geographical location of the respective further portable electronic devices; and using the accessed partial GNSS data of the further portable electronic devices to supplement the received partial GNSS data of the first portable electronic device to thereby determine the geographical location of the first device.

In another aspect there is provided a computer readable medium comprising computer code stored thereon, the computer code being configured to, when run on a processor, perform the method of aspect immediately above.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:—

FIGS. 2a & 2b illustrate an example of how this apparatus can operate.

FIG. 3a illustrates an example of a further embodiment.

FIG. 3b illustrates an example frame structure for GNSS data.

FIG. 3c illustrates measuring synchronisation error between two or more respective partial GNSS data sets.

FIG. 3d illustrates summing/integration of synchronised GNSS data to improve signal-to-noise ratio.

FIG. 4 illustrates combining synchronised GNSS data to provide a combined data set so as to reduce bit error.

FIG. 5 illustrates another example of a further embodiment utilising an ad-hoc network between devices.

FIG. 6 illustrates another example of a further embodiment utilising an ad-hoc network between devices and range-finding to compensate for distance between neighbouring devices.

FIG. 8 illustrates schematically a computer readable media providing a program according to an embodiment of the present invention.

FIGS. 9a & 9b illustrate a comparison between prior art and one or more embodiments of the present disclosure.

FIG. 10 illustrates a summary of one or more embodiments of the present disclosure.

FIG. 11 illustrates another embodiment of the present disclosure.

DESCRIPTION OF EXAMPLE ASPECTS/EMBODIMENTS

Figure 1:
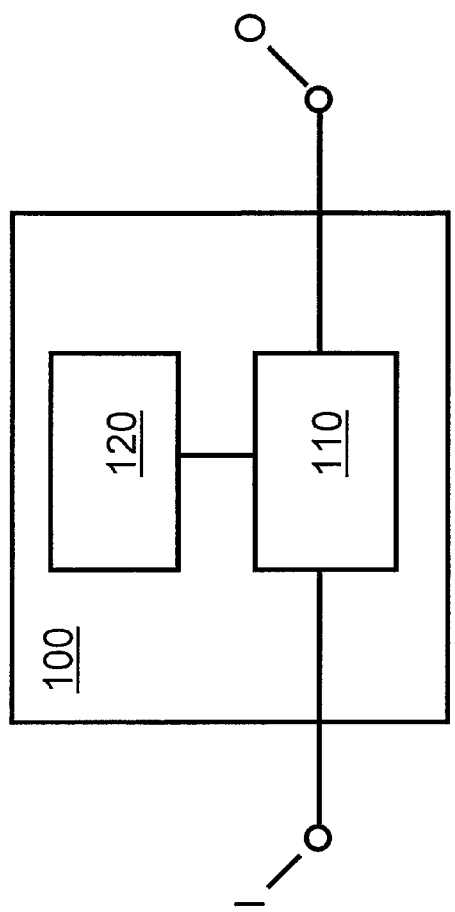
FIG. 1 illustrates an apparatus according to one embodiment of the present disclosure.

In one or more embodiments described herein, there is provided an apparatus comprising a memory and a processor. Computer code is stored on the memory, and is configured to perform certain operations when run on the processor. The code is configured to allow the apparatus to receive partial GNSS data from one or more GNSS satellites relating to the geographical location of a first portable electronic device, wherein the received partial GNSS data is insufficient for determining the geographical location of the first portable electronic device.

The code is also configured to cause the apparatus to communicate with one or more further portable electronic devices in proximity to the first portable electronic device to access partial GNSS data relating to the geographical location of the respective further portable electronic devices.

The code is also configured to cause the apparatus to use the accessed partial GNSS data of the further portable electronic devices to supplement the received partial GNSS data of the first portable electronic device to thereby determine the geographical location of the first device.

As has been discussed in the background, sometimes portable electronic devices with the ability to determine their own geographical location via satellite systems are not able to establish fixes due to poor reception or other mitigating factors. For example, portable electronic devices often suffer from poor satellite reception when indoors (whereas devices outdoors tend to experience better reception) and often cannot get a satellite fix from the required number of satellites (at least four) in order to complete a geographical location determination. Such devices may receive only partial GNSS data from less than four satellites, such data being insufficient for determining their own geographical location.

By communicating with other neighbouring devices (that may also be suffering similar difficulties) it is possible to access their own respective GNSS data (which may also be partial). This can be done using short-range wireless communication, such as Bluetooth™ or the like (discussed in more detail below). This additional GNSS data can be used to supplement the first device's partial GNSS data so that positioning information from a sufficient number of satellites is provided via these other devices.

This concept involves using GNSS data from nearby neighbouring/proximal devices to enable the geographical location of a first device to be determined. As has been discussed in the background section, such GNSS-capable devices will sample the data transmitted by GNSS satellites to obtain/generate raw IQ sample data by sampling the satellites' transmitted signals/signalling. This raw IQ data contains various types of information that allow the receiving device to calculate its geographical location. The information is extracted in the form of raw GNSS data bits, i.e. it has been decoded from the raw IQ data/samples/signalling, but has not been operated on further. In such GNSS capable devices, the raw GNSS data bits are typically operated on (after extraction) to identify other measurements relating to the raw GNSS data bits/IQ data. For example, to measure e.g. pseudo-ranges from the device to the satellite, delta-ranges, demodulation of the data bits, correlation of data bits from same/different satellites, and the like.

In this embodiment and others described below, the "GNSS data" used in relation to partial GNSS data comprises raw GNSS IQ data, and/or raw GNSS data bits. It will be appreciated that GNSS data may also comprise demodulated data bits, and measurements derived/obtained from the received IQ data/samples/bits. These measurements can be one or more of: pseudo-oranges between the first device and one or more satellites, Doppler measurements of the received GNSS satellite signal, carrier phase of the GNSS satellite signal, or the like. The GNSS data can also include one or more of subframes of the GNSS satellite signal, navigation data from the first device and/or network, and assistance data from the first device and/or network (for example, satellite ephemeris predictions generated by the device, e.g. by SAGPS™ technology).

As the distance between neighbouring/proximal devices is relatively negligible in relation to the distance that the satellite signal has travelled over to be received by the respective devices, it is reasonably accurate to assume that GNSS data received by one neighbouring device can be treated as GNSS data for any other neighbouring device, i.e. one device can use GNSS data from another nearby device in combination with its own GNSS data to thereby calculate its own position (this is illustrated in FIG. 2b and will be discussed in more detail below).

In essence, a first device may need GNSS data from a further one/two/three satellites to establish their geographical location, but cannot directly receive this data itself (for one reason or another). Based on above principle, the first device can access the further GNSS data it needs from additional satellites via communication with neighbouring/proximal devices that have such GNSS data from the further required satellites. The information shared among the neighbouring devices can therefore be advantageously used to improve the total number of measurements, in effect making it possible to be able to calculate the location of such devices even in sub-preferable indoor conditions.

We will now describe an apparatus 100 of a first embodiment with reference to FIG. 1, which illustrates this apparatus 100.

In this embodiment, the apparatus 100 is part of a portable electronic device with geographical location determination functionality, such as GPS or the like. The portable electronic device is able to receive GNSS data from one or more satellites (specifically to obtain raw IQ data sampled from signals transmitted by one or more GNSS satellites via, for example, an antenna or existing GPS/GNSS arrangement).

At present, GPS functionality is typically provided by a dedicated ASIC (Application Specific Integrated Circuit) due to high data processing requirements for such functionality. The time domain correlation and integration functions of extremely weak spread spectrum signals (needed for the GPS signal acquisition and tracking) require >>100 MIPS (million instructions per second) and until now the most optimal solution has been a dedicated GPS ASIC (for example, so as to be able to implement a tuned/matched filter for GPS L1 CA-codes). This can often result in some non-real time functions being implemented either on the chip-integrated MCU (multi-point control unit) or as separate positioning engine software executed in a host-MCU. Various implementations of this technology and the general operation of GPS, GNSS, and other satellite-based geographical location/positioning systems will be appreciated by the skilled person, and is only discussed briefly here for completeness.

The portable electronic device is also able to perform short-range wireless communication (e.g. such as Bluetooth, WiFi, or the like) so as to be able to communicate with other devices in proximity to this portable electronic device.

For example, Bluetooth™ technology and other short-range wireless communication technologies offer a variety of different ways to keep the devices connected. The connectivity can be kept restricted by a user and private, but there are also ways to create complex ad-hoc networks for sharing any kind of information between devices that are part of that network.

In particular, Bluetooth™ standard version 3.0 defines a possibility to use 802.11(WLAN) for making high speed data transferring between devices. For example devices can start a data transferring session using Bluetooth™, but they can agree to switch to use 802.11 to get higher data transferring speeds. In this case a WLAN access point is not needed for making connections and devices can start to use 802.11 the connection automatically.

It is well appreciated in the art how to manufacture such portable electronic devices to have geographical location determination functionality and short-range wireless communication functionality and will not be discussed further here.

In this embodiment the apparatus 100 is to be provided as part of such a portable electronic device (e.g. as an Application Specific Integrated Circuit, or a module, or the like) having geographical location determination functionality and short-range wireless communication functionality. The skilled person will appreciate that there are other embodiments in which the apparatus 100 may be provided separately from the aforementioned electronic device, or the like (e.g. as part of a server, network, or system/navigation system, etc).

The apparatus 100 comprises an input (I), an output (O), a processor 110 and a memory 120.

The input (I) allows for the apparatus 100 to receive GNSS data for the portable electronic device from the one or more satellites. The output (O) allows the apparatus 100 to utilise the wireless communication functionality of the portable electronic device to communicate with one or more respective further portable electronic devices to access the GNSS data for those devices as received from one or more satellites. The output (O) also allows the apparatus 100 to provide an output to the portable electronic device as to the geographical location of the device based on the accessed GNSS data of the respective further electronic devices. The input (I) and output (O) are part of a connection bus that allows for electrical connection/communication with the portable electronic device.

The processor 110 is a general purpose processor. In other embodiments the processor 110 may be a dedicated ASIC. The processor 100 is configured to be able to operate on GNSS data received via the input so as to provide an output (via the output as signalling, for example). Such processors and processing means are well understood in the art.

The memory 120 is solid-state memory that stores a set of instructions (in the form of computer program code). The memory 120 stores these instructions so the processor can utilise these instructions to operate on the received GNSS data. The instructions cause the processor 110 (and therefore the apparatus 100) to perform certain functions when the computer code instructions are run on the processor 110. These functions will be described in more detail below.

The processor 110 and memory 120 are electrically interconnected within the apparatus 100 (and to the connected/connectable input and output of the connection bus) to allow the instructions stored on the memory 120 to be run on the processor 110, and to allow the processor 110 to operate on GNSS data received via the input (I) based on these instructions. In other embodiments, the memory 120 can be provided separately from the apparatus 100, and the processor 110 can access the memory block 120 via the connection bus (or even a separate connection—not shown).

The formation of such processors and integration within electronic devices, and the design of such processors to achieve application specific objectives is well known and would be well appreciated by the skilled person based on the above discussion. We will therefore not discuss these aspects in detail.

In relation to the instructions on the memory 120, these instructions set out at least one scheme that governs how the apparatus 100 as a whole operates on and analyses received and accessed GNSS data. To clearly explain how this scheme would operate, we will now describe how this apparatus 100 can be used in an example scenario with reference to FIG. 2a.

Figure 2A:
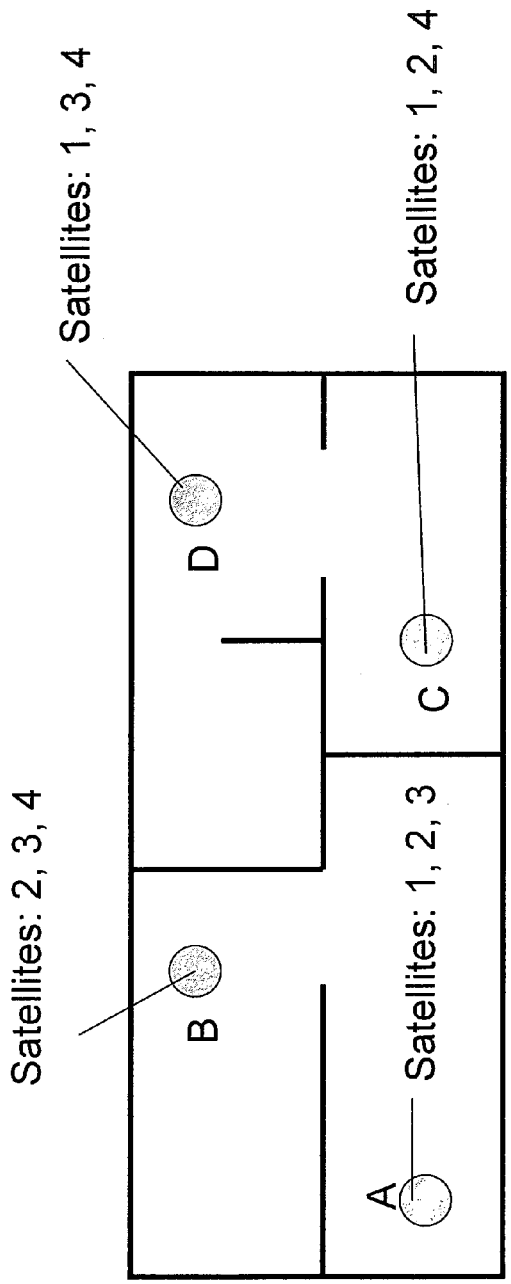

FIG. 2a illustrates a floor of a building, with four portable electronic devices A-D each having geographical location determination functionality and short-range wireless communication functionality. Each of the devices is positioned indoors within different respective rooms of the floor of the building. If a device wishes to identify its geographical location, in order to reliably establish a geographical location fix, four satellites worth of GNSS data must be received by each device. In effect, complete GNSS data must be received from four distinct satellites of the same system (e.g. all from NAVSTAR, GLONASS, or the like) in order to pinpoint the device's geographical location.

However, the devices A-D are indoors and this can cause problems with satellite reception when trying to receive complete GNSS data from different satellites. As will be noted from FIG. 2a, the devices are in an area that can receive signals from satellites 1-4 of the same GNSS system (for example, NAVSTAR). Collectively, the devices have received raw GNSS data from four distinct satellites.

In this example situation, the reception is so poor that each device A-D only respectively receives three satellites worth of GNSS data (device A only receives data from satellites 1, 2 & 3; device B only receives data from satellites 2, 3 & 4; etc). Without four complete satellites' GNSS data, the respective devices cannot determine their own respective geographical locations (for example, because the devices cannot calculate respective pseudo-ranges—FIG. 9a illustrates how pseudo-ranges are computationally compared and assessed in order to identify geographical location of a given device in the prior art).

The satellite GNSS data received by the respective devices is therefore only partial GNSS data as it is insufficient for each device to determine their own geographical location. The apparatus 100 of the present embodiment can help to alleviate this issue.

In this example scenario, the first device A includes the apparatus 100 discussed above. The first device A receives the partial GNSS data (as per its own dedicated geographical location determination functionality) and passes this to apparatus 100 via the input (I). Upon receiving the partial GNSS data at the input (I), the instructions on the memory 120 are run on the processor 110 to cause the processor 110/apparatus 100 to operate on the received GNSS data.

In this embodiment, the instructions cause the processor 110 to verify whether the GNSS data received is sufficient to determine a geographical location for the first device A. In this situation, only three satellites worth of GNSS data have been received. The GNSS data is therefore partial, and insufficient for determining geographical location. Therefore further GNSS data from a further satellite is required to establish a geographical location for the first device A.

In response to this, the instructions cause the processor 110 to utilise the wireless communication functionality of the device A to communicate with the other devices B-D in the proximity of device A (via output (O)). Examples of how GNSS data can be shared between devices can be seen in US2009/228209 and WO 06/094573.

This communication is used to access the other devices' respective partial GNSS data. This can be done in a similar way to browsing another device via Bluetooth™, or like accessing another computer in a network, or the like. The apparatus 100 is caused to communicate with one or more of the other devices to access the GNSS data that they have received from various satellites. This is then accessed and retrieved for use by the first device A.

In this embodiment, the instructions cause the processor 110 to identify, for each of the accessed partial GNSS data, the satellite from where the GNSS data originated. This is helpful to be able to know which portions of partial GNSS data and from which devices B-D should be used to supplement the first device GNSS data. For example, the apparatus 100 has identified that GNSS data from a fourth additional satellite is needed to be able to determine geographical location of the first device A. Therefore, by identifying the satellite from where each of the accessed GNSS data originated, the apparatus 100 can verify whether any of the accessed GNSS data provides that further GNSS data from a further satellite.

It will be appreciated that if GNSS data from just one further satellite can be accessed by the first device A, then four satellites worth of GNSS data will have been collected/accessed by the apparatus 100 for the first device A.

Each of the devices is within ~10-15 m of each other. As is illustrated in FIG. 2b, this lateral distance between devices is relatively negligible in relation to the distance that the satellite signal has traveled to the respective devices. As such, it is reasonably accurate to assume that GNSS data received by one neighbouring device can be treated as GNSS data for any other neighbouring device. It should be noted that for sharing GNSS data the distance is negligible and not necessarily used, however can be utilised in other embodiments (discussed below).

Therefore, the apparatus 100 uses the accessed GNSS data from satellite 4 as received by any one of devices B-D to supplement the partial GNSS data of the first device A. At this point, the apparatus 100 has four satellites worth of GNSS data. This can therefore allow the geographical location of the first device A to be determined. From this accessed and supplemented "collective" GNSS data, a geographical location for the first device A can be determined from this information in the same manner as normal geographical location determination methods known in the art.

The basic premise, at least in this embodiment, of the apparatus 100 accessing and using partial GNSS data from other devices (B-D) is that the devices are at a short-range distance from the first device A, i.e. on the order of 10-15 m. Therefore, on a global scale and for the purposes of supplementing first device GNSS data to establish a first fix/geographical location, this 10-15 m difference is negligible, and is preferable in many situations over not having a geographical location fix at all. FIG. 9b illustrates, in contrast with the prior art illustration of FIG. 9a, how GNSS data from a number of different devices can be utilised to establish pseudo-ranges that can then be compared to aid in determining a geographical location fix for devices that would otherwise be unable to do so on their end. This sharing of data (for example, through the pseudo-ranges shared between devices as illustrated in FIG. 9b) can provide for many advantages (discussed below).

In this embodiment, the raw GNSS IQ data on each of the further devices B-D as received directly from the satellite is the data that is accessed by the apparatus 100. In other embodiments, the GNSS data may have already been decoded into raw GNSS data bits by the other devices, and the apparatus 100 may instead access the partial GNSS data bits for the other devices.

In still other embodiments, the raw GNSS data (IQ or data bits) of other devices may have been operated on by these devices to establish actual timing/location/distance values (e.g. in SI units or GPS co-ordinates, or the like). In such embodiments, the apparatus 100 may access/receive actual values from nearby devices rather than the raw GNSS data itself. This can help in reducing the amount of bandwidth, battery power, and computational power spent transmitting/receiving/operating on raw data that has already been operated on by another device to identify useful information/values.

We will now describe another embodiment with reference to FIGS. 3a-3d.

In some situations, the raw GNSS data received at device A may be corrupted in some way (e.g. the raw IQ data or GNSS data bits extracted therefrom). Therefore, even if GNSS data from all four required satellites is received, if the data from one (or more) of the satellites is corrupted, or the signal-to-noise ratio is too low (due to poor reception for example), or there is a bit error that requires correction, then geographical location may not be determinable. These issues may arise as a result of poor reception due to the indoor position of the device, or other reasons. Other embodiments of the present disclosure help to alleviate these issues.

In a further embodiment shown in FIG. 3a, there are four devices on the floor of a building (substantially the same as in FIG. 2a). Whilst in FIG. 2a, each device only receives data from three satellites, in this situation shown in FIG. 3a each device receives raw IQ data from all four satellites (satellites 1-4). However, each of the respective raw IQ GNSS data sampled by each of the devices is corrupted in some way, for example, with portions missing that cause bit errors, and portions with poor signal-to-noise ratio. This renders the GNSS data bits from each satellite unusable for determining geographical location of the respective devices A-D. In contrast with the first embodiment of FIG. 2a, GNSS data for satellites already received by the apparatus 200 needs to be supplemented to be used in geographical location determination.

The first device A includes apparatus 200 having memory 220 and processor 210 and, as for the embodiment of FIG. 2a, the memory 220 comprises instructions that cause the processor 210/apparatus 200 to perform certain functions so as to operate on the received partial GNSS data.

In this embodiment, the instructions cause the processor 210 to additionally operate on the received GNSS data for the first device A to identify whether it is usable or not, i.e. to identify whether there are any corrupt portions or not. The apparatus 200 therefore identifies that the GNSS data is partial and corrupted, and that further GNSS data is needed to establish a location fix.

Following this, the instructions cause the processor 210 to access the partial GNSS data in substantially the same way as the first embodiment. In order for satellite GNSS data from satellites 1-4 as received by the devices B-D to be useful to the apparatus 200 of device A, the respective data from each device needs to be synchronised to ensure coherency in the supplementing of the originally received data for the first device.

Therefore, in this embodiment, the instructions cause the processor 210 to measure a synchronisation error between the first and respective further devices based on GNSS data as received by respective devices but from the same satellite, i.e. GNSS data from a first satellite is received at two different devices. This is done by comparing the partial GNSS data for the first device A and the respective further devices B-D to measure a synchronisation error between them. This can be done in a number of different ways.

For example, frame structures of GNSS data for a given GNSS system typically take on a particular syntax (see FIG. 3b, for example) with certain data portions being common across the raw IQ data being sampled from signals transmitted by different satellites. This can be used advantageously to identify the time difference between one or more common timestamp peaks that should be present across all the pseudorandom codes transmitted by different satellites of the same system. If the syntax is known, then specific peaks that are known to occur within the syntax of the frame structure for GNSS data known to originate from the same satellite but having been received by two different devices can be used to identify the time difference. For example, FIG. 3c shows that the known 'XCOR' timestamp peak has a very distinct appearance. The time difference between the identified timestamp peaks in GNSS data from a given satellite (such as satellite 4) that has been received by device A, and one or more of the other devices B-D, can be used to synchronise the GNSS data from that satellite across the different devices.

Alternatively, it is possible to identify the time difference based on common data patterns. This is similar in principle to using common timestamp peaks, common data patterns (e.g. portions of the respective further and first device partial GNSS data) can be compared to one another to identify common data patterns. As GNSS data transmitted by satellites is pseudorandom, it is therefore unique and therefore there should be a strong and obvious correlation between common data patterns relative to non-common data patterns.

This can also help to identify the time difference between GNSS data from the same satellite as received by different devices A-D. For example, patterns can be identified from the GPS preamble, TOW or even full GPS words (TLM word, HOW word) etc from the respective GNSS data.

The instructions cause processor 210 to measure the synchronisation error between the GNSS data as originating from the same satellite and as received by different devices using either or both of the above methods. As the distance between the devices is negligible, and the GNSS data originated from the same satellite for both devices, the time difference between the respective received data streams represents the clock difference between the two devices. Once the time difference has been measured for given compared GNSS data, the instructions cause the processor 210 to synchronise the partial GNSS data by correcting for the measured time difference. This helps to 'align' the partial GNSS data from the same satellite as received by different devices and reduce the likelihood of an erroneous time offset between GNSS data from different devices.

In this particular embodiment, the instructions then cause the processor 210 to sum the synchronised GNSS data for a given satellite together, i.e. all GNSS data for satellite 1 (both as received by the first device A and the data accessed on the other devices B-D) is (in a preferable case) coherently summed together. Furthermore, the measured time difference representing the synchronisation error can for data bit summation, or extending non-coherent integration or even for de-biasing the code phase measurements (as is appreciated in the art). This can yield several advantages. For example, by summing the synchronised data, this serves to improve the signal-to-noise ratio of the GNSS data for that satellite. In an alternative embodiment, the apparatus is configured to integrate the respective GNSS data from the devices prior to summing the data so as to further improve the signal-to-noise ratio. This is illustrated in FIG. 3d It should be noted that once the time difference between device A and another device (B, C or D) is identified (i.e. for given partial GNSS data for a particular satellite as received by the other device), then this identified synchronisation error can be used to synchronise the partial GNSS data from other satellites as received by that same device (B, C or D).

This provides for another simple way of supplementing first device partial GNSS data so as to be able to determine geographical location of that device, even when GNSS data has been corrupted or is unusable for some reason.

In some situations, this type of data sharing can be used to improve data acquisition i.e. sensitivity. In such cases, the devices need to be synchronized very accurately to each other to allow for summing of raw GNSS data for signal-to-noise improvement. For example, the synchronization error should be smaller than 1 microsecond (GPS chip length) such as 200 nanoseconds or lower to provide greater sensitivity levels.

FIG. 3d illustrates that even if individual signal levels are too weak for use (i.e. below the threshold that indicates signals are fit for use in geographical location determination), summing these together improves the sensitivity to create a more reliable signal with better signal-to-noise ratio. The skilled person will appreciate that the effectiveness of these embodiments improves with the number of the contributing devices: the more data, the better the resolution.

In some situations, the error or data corruption may be so great in places that summing GNSS data may not be sufficient. Therefore, another embodiment is provided that can help to alleviate this issue (we have not shown this as it is substantially the same as earlier embodiments, at least physically). With reference to FIG. 4, by combining certain portions of corresponding partial GNSS data it is possible to form a combined GNSS data bit sequence.

As in earlier embodiments, once the apparatus 100 has identified that received GNSS data is partial and insufficient in one way or another (e.g. due to bit errors) and has accessed partial GNSS data from other devices (e.g. B-D), the instructions cause the processor to share (for example, uncorrupted) data bits or portions of corresponding respective further and first device partial GNSS data identified to originate from the same satellite to create a combined bit sequence with reduced errors. In effect, "splicing" together uncorrupted portions of corresponding GNSS data to create an (ideally) "error-free" combined bit sequence, thereby reduce bit error in the supplemented GNSS data. This is shown clearly in FIG. 4. This can involve using portions of the GNSS data from different devices that have the least error in them, to produce a more accurate combined GNSS data reading from a given satellite (see FIG. 4).

Despite the high bit error in the raw GNSS data, the time difference can be found simply by cross-correlating the data sequences. As can be seen from FIG. 4, the cross-correlation result allows for simple and easy provision of required time synchronisation between devices.

In a further alternative embodiment (shown in FIG. 4), it is possible to identify a time difference and perform synchronisation of partial GNSS data from different satellites as received by different devices. This is done in the same manner as the embodiment of FIGS. 3a-4, except that the instructions also cause the processor to calculate the time of flight and satellite clock differences between the two or more different satellites based on ephemeris reference location of the respective identified satellites.

The instructions then cause the processor to perform alignment of the respective further and first device partial GNSS data by performing time correction on the respective further device partial GNSS data based on the calculated time of flight and/or satellite clock differences.

This cross-correlation based synchronisation approach is shown and explained in FIG. 10. This variation is similar in principle to the embodiment performing synchronisation on same satellite GNSS data received by two different devices, except that time-of-flight difference must also be compensated for before clock/synchronisation difference between the respective devices can be accounted for.

These approaches described above can also be used/generalised to "soft" data bits such as the respective components of raw IQ GNSS data. This approach is also more tolerant to bit errors than other known methods and can even tolerate some slips between cycles. Furthermore, once the synchronisation error/time difference has been done/measured even for just one of the satellites common to different devices, the result can be used to align the data for the rest of the common satellites across those devices no matter how weak the signals from the satellites.

In one or more of the above embodiments, the apparatus has accessed each of the other devices partial GNSS data and only helped to determine the geographical location of the first device. However, it will be appreciated that this sharing of partial GNSS data can be generalised to all the devices in a given locale. For example, the first device could also provide its own partial GNSS data to the other devices it communicates with so that their own partial GNSS data is supplemented. This can be generalised further in the scenario shown in FIG. 5.

In this figure, each of the devices has its own apparatus for accessing and using partial GNSS data from other devices to supplement its own. In such embodiments, respective apparatus comprised by two or more devices set up an ad-hoc network for on-the-fly sharing of GNSS data between respective devices. The operation of this embodiment is illustrated clearly in FIG. 5, and the implementation would be well appreciated based on the skilled person's understanding. In situations where each device is provided with such functionality to access further GNSS data of other devices to supplement its own, a more robust and co-operative way of providing for geographical location fixes for devices where reception is an issue can be provided.

The operation of the embodiment of FIG. 5 can be surmised in the following steps:
1) The "device" is actually a "virtual device" that is formed from a group of devices (e.g. like devices A-D in FIGS. 2a & 3a) connected together via a wireless ad-hoc radio (e.g. Bluetooth or the like)
2) The devices are all fall within 10-30 m radius from the centre of the "collective" of the ad-hoc network of devices. This relative positioning helps to reduce the spatial pseudo-range errors
3) Initially, the devices receive only partial GNSS data from different satellites.
Therefore, the devices in the group are not able to:
a. acquire usable satellite signals due to poor signal-to-noise (SNR) ratio or
b. demodulate the data due to high bit-error-rate (BER)
4) As a result, the devices communicate with one another and access each others GNSS data. The devices in the group then operate (using one or more embodiments described above) on the GNSS data to synchronise themselves to one another. Ideally, the time differences are known within:
a. 200 nanoseconds or less if the raw IQ data is transferred/shared or
b. 1-10 ms or less if raw GNSS data bits are transferred/shared
5) As a result, each device can be understood to be "collectively" contributing raw GNSS data to other devices in the group. This helps to improve acquisition sensitivity and data demodulation (as discussed above).
6) Finally, complete navigation data and/or GNSS system time is demodulated from the combined data to allow for geographical location determination.

In a variation of this embodiment of FIG. 5, the apparatus does not access all the partial GNSS data of another device. Instead, the apparatus first communicates with the other devices to establish which satellite GNSS data they each have, and only to access GNSS data that is needed to determine first device geographical location (e.g. the apparatus may be considered to make a specific GNSS query to the other respective devices before accessing their data). Similarly, the apparatus may only provide GNSS data when queried for specific GNSS data. Alternatively, GNSS data may be 'traded' between devices, wherein GNSS data of a first device is not allowed to be accessed by a second without a mutual exchange of GNSS data. This could be a preference settable by a user of the device, or it could be a standard instruction stored on the memory to control operation of the apparatus.

In the above embodiments, the supplementing of GNSS data to achieve a geographical location fix is based on the assumption that neighbouring devices can share data without significantly impacting the accuracy of the resulting calculation. However, in some situations, a more accurate fix may be preferred by the user of the portable electronic device. In such situations the basic premise that GNSS data received by a further proximal device is sufficient for establishing a reasonably accurate geographical location fix may not be satisfactory for the user. It can therefore be helpful to compensate for the distance and direction between the first user portable electronic device ('A' as in FIGS. 2*a*-4) and one or more other further portable electronic devices.

FIG. 5 also illustrates how relative distance and direction between devices can be utilised to establish what can be considered to be a "group" geographical location. This is illustrated quite simply by the virtual device in FIG. 5.

We will now describe a further embodiment with reference to FIG. 6.

In this embodiment, the instructions on the memory cause the processor of the apparatus to utilise the wireless communication functionality of the device to not only access the further partial GNSS data of the further devices, but also to determine the range between the first device and the one or more further devices that have been communicated with (e.g. utilising Nokia™ Find&Do technology, for example U.S. Pat. No. 7,667,646 or other equivalents). In another embodiment the processor is also caused to determine the direction the further device is located in (relative to the first device A). This has been shown in the context of an ad-hoc network embodiment like that shown in FIG. 5 (i.e. each apparatus of each device performs range-finding to compensate for the spatial difference between each of the devices). The skilled person will appreciate that this range-finding and compensation functionality may be provided in individual devices that are not part of such an ad-hoc network.

The apparatus is able to use this range and/or direction to supplement the first device partial GNSS data to help in determining a collective geographical location for the neighbouring devices (as is also illustrated in FIG. 5).

Figure 7:
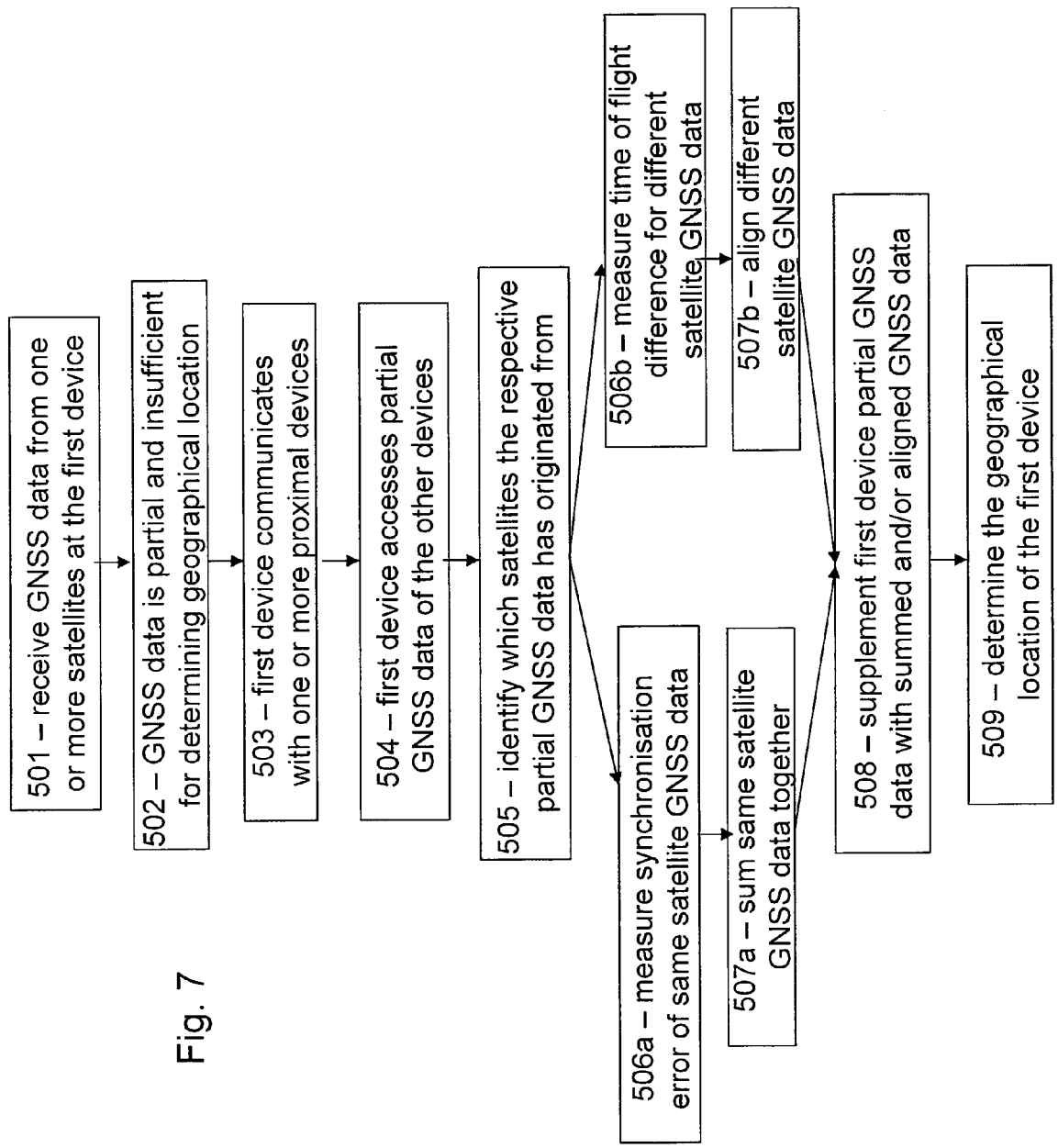
FIG. 7 illustrates a method of operation according to one embodiment of the present disclosure.

FIG. 7 illustrates a method of operation according to one or more embodiments of the present disclosure. This flowchart shows various steps that a given apparatus can perform to provide for use of partial GNSS data of further devices to be able to determine the geographical location of its corresponding portable electronic device. Given that each of these operations/steps has been discussed in great detail above, these steps will not be discussed further here.

FIG. 8 illustrates schematically a computer/processor readable media 600 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state).

For example, FIG. 11 shows an example where a portable electronic device (having a display and user interface) also internally comprises a processor and a memory. The memory has instructions stored thereon in the form of computer program code, the code being configured to, when run, perform the method shown in FIG. 7 and described above.

The apparatus may also comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
    at least one non-transitory memory; and
    at least one processor, wherein the at least one non-transitory memory comprises computer code stored thereon, the computer code being configured to, when run on the at least one processor, cause the apparatus to perform at least:
        receiving partial GNSS data from one or more respective GNSS satellites relating to geographical location of a first portable electronic device, wherein the received partial GNSS data is insufficient, by being corrupt, for determining the geographical location of the first portable electronic device;
        communicating with one or more further portable electronic devices in proximity to the first portable electronic device to access corresponding partial GNSS data relating to geographical location of the respective further portable electronic devices, the partial GNSS data of the one or more respective further portable electronic devices being corrupt;
        measuring a synchronisation error between the first and respective further portable electronic devices based on a comparison between the respective further and first portable electronic device partial GNSS data to allow for synchronisation of the respective further and first portable electronic device partial GNSS data, wherein the synchronisation error is measured by identifying a time difference between one or more common timestamp peaks of the partial GNSS data from the respective further and first portable electronic devices; and
        using the measured synchronisation error and the accessed partial GNSS data of the further portable electronic devices to supplement the received partial GNSS data of the first portable electronic device to thereby determine the geographical location of the first portable electronic device.

2. The apparatus of claim 1, wherein the computer code is configured to, when run on the at least one processor, cause the apparatus to use the accessed partial GNSS data of the further portable electronic devices by:
    identifying the one or more respective GNSS satellites from where the partial GNSS data of the first portable electronic device and the respective further portable electronic devices originated to supplement the received partial GNSS data of the first portable electronic device so that the supplemented partial GNSS data is sufficient for determining the geographical location of the first portable electronic device.

3. The apparatus of claim 1, wherein the computer code is configured to, when run on the at least one processor, cause the apparatus to measure the synchronisation error by matching one or more common data patterns between the respective partial GNSS data from the respective further and first portable electronic devices.

4. The apparatus of claim 1, wherein the computer code is configured to, when run on the at least one processor, cause the apparatus to synchronise the respective further and first portable electronic device partial GNSS data using the measured synchronisation error.

5. The apparatus of claim 1, wherein the measured synchronisation error is indicative of a time offset in respective further portable electronic device partial GNSS data, and wherein the computer code is configured to, when run on the at least one processor, cause the apparatus to synchronise the respective further and first portable electronic device partial GNSS data by using this time offset indicated by the synchronisation error to perform time correction on the respective further portable electronic device partial GNSS data.

6. The apparatus of claim 1, wherein the computer code is configured to, when run on the at least one processor, cause the apparatus to use the accessed partial GNSS data of the further portable electronic devices by:
    identifying the respective GNSS satellites from where the partial GNSS data of the first portable electronic device and the respective further portable electronic devices originated; and
    calculating, for respective further and first portable electronic device partial GNSS data identified to originate from two or more different identified satellites, time of flight and satellite clock differences between the two or more different identified satellites based on ephemeris reference location of the respective two or more different identified satellites to allow for alignment of corresponding respective further portable electronic device partial GNSS data.

7. The apparatus of claim 6, wherein the computer code is configured to, when run on the at least one processor, align the corresponding respective further and first portable electronic device partial GNSS data by using the calculated time of flight and/or satellite clock differences.

8. The apparatus of claim 1, wherein the computer code is configured to, when run on the at least one processor, cause the apparatus to use the accessed respective further portable electronic device partial GNSS data by:
    identifying respective GNSS satellites from where the partial GNSS data of the first portable electronic device and the respective further portable electronic devices originated; and
    summing respective further portable electronic device and first portable electronic device partial GNSS data identified to originate from a same satellite of the respective GNSS satellites to thereby supplement the partial GNSS data of the first portable electronic device to correct for data bit error in the GNSS data from each respective satellite.

9. The apparatus of claim 1, wherein the computer code is configured to, when run on the at least one processor, cause the apparatus to use one or more of the following types of partial GNSS data from the respective further portable electronic devices and the first portable electronic device to determine the geographical location of the first portable electronic device:
raw IQ data, and raw GNSS data bits.

10. The apparatus of claim 1, wherein the computer code is configured to, when run on the at least one processor, cause the apparatus to use the accessed respective further portable electronic device partial GNSS data by:
determining the range between the first portable electronic device and the one or more respective further portable electronic devices that have been communicated with to further supplement the first portable electronic device partial GNSS data.

11. The apparatus of claim 1, wherein the computer code is configured to, when run on the at least one processor and the partial GNSS data of the first and respective further portable electronic devices comprises raw GNSS data bits, cause the apparatus to use the synchronised respective further and first portable electronic device raw GNSS data bits to:
form a combined GNSS data bit sequence by sharing data bits of corresponding respective further and first portable electronic device partial GNSS data identified to originate from the same satellite to thereby reduce bit error in the respective further and first portable electronic device partial GNSS data.

12. The apparatus of claim 1, wherein the apparatus is one or more of: a portable electronic device, a module for a portable electronic device, a network for portable electronic devices, a system for portable electronic devices.

13. An apparatus comprising:
means for receiving partial GNSS data from one or more respective GNSS satellites relating to geographical location of a first portable electronic device, wherein the received partial GNSS data is insufficient, be being corrupt, for determining the geographical location of the first portable electronic device;
means for communicating with one or more further portable electronic devices in proximity to the first portable electronic device to access corresponding partial GNSS data relating to geographical location of the respective further portable electronic device, the partial GNSS data of the one or more respective further portable electronic devices being corrupt;
means for measuring a synchronisation error between the first and respective further portable electronic devices based on a comparison between the respective further and first portable electronic device partial GNSS data to allow for synchronisation of the respective further and first portable electronic device partial GNSS data, wherein the synchronisation error is measured by identifying a time difference between one or more common timestamp peaks of the partial GNSS data from the respective further and first portable electronic devices; and
means for using the measured synchronisation error and the accessed partial GNSS data of the further portable electronic devices to supplement the received partial GNSS data of the first portable electronic device to thereby determine the geographical location of the first portable electronic device.

14. A method comprising:
receiving partial GNSS data from one or more respective GNSS satellites relating to geographical location of a first portable electronic device, wherein the received partial GNSS data is insufficient, by being corrupt, for determining the geographical location of the first portable electronic device;
communicating with one or more further portable electronic devices in proximity to the first portable electronic device to access corresponding partial GNSS data relating to geographical location of the respective further portable electronic devices, the partial GNSS data of the one or more respective further portable electronic devices being corrupt;
measuring a synchronisation error between the first and respective further portable electronic devices based on a comparison between the respective further and first portable electronic device partial GNSS data to allow for synchronisation of the respective further and first portable electronic device partial GNSS data, wherein the synchronisation error is measured by identifying a time difference between one or more common timestamp peaks of the partial GNSS data from the respective further and first portable electronic devices; and
using the measured synchronisation error and the accessed partial GNSS data of the further portable electronic devices to supplement the received partial GNSS data of the first portable electronic device to thereby determine the geographical location of the first portable electronic device.

15. A non-transitory computer readable medium comprising computer code stored thereon, the computer code being configured to, when run on a processor, perform the method of claim 14.

* * * * *